March 25, 1969 R. CARETTA ET AL 3,434,897
METHOD FOR MANUFACTURING PNEUMATIC TIRES
Filed July 23, 1965
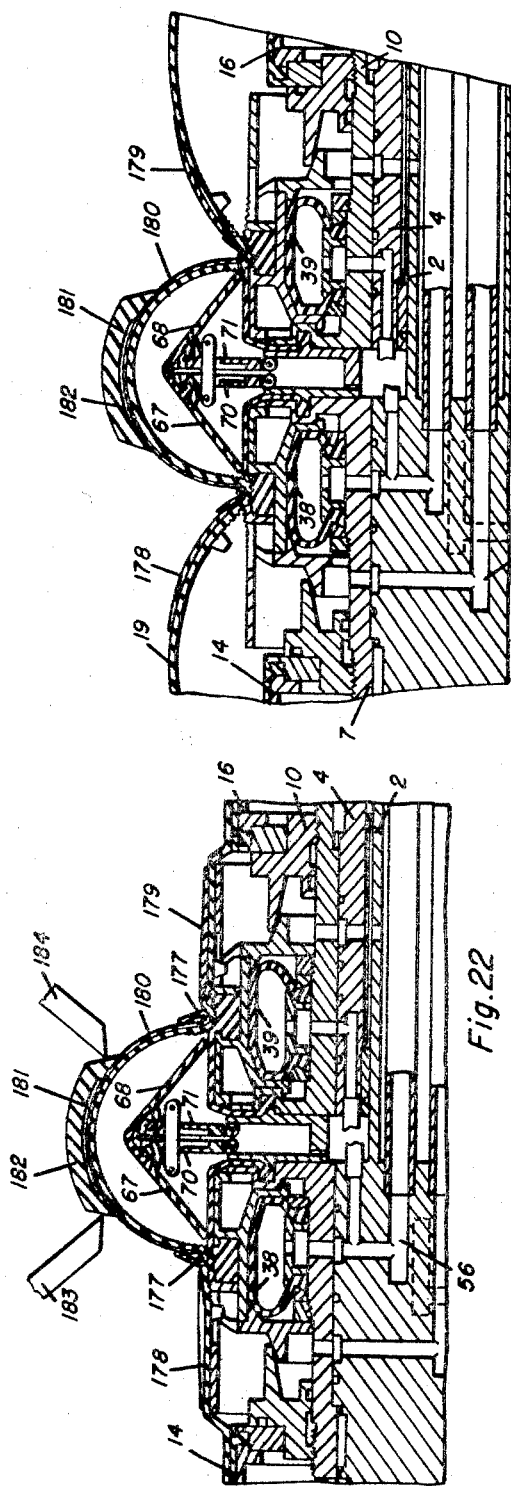
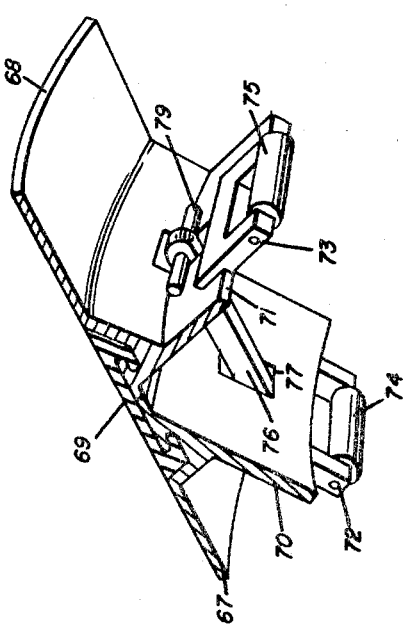
Inventors
Renato Caretta
Antonio Pacciarini
Dario Giletta
By Stevens, Davis, Miller & Mosher
Attorneys

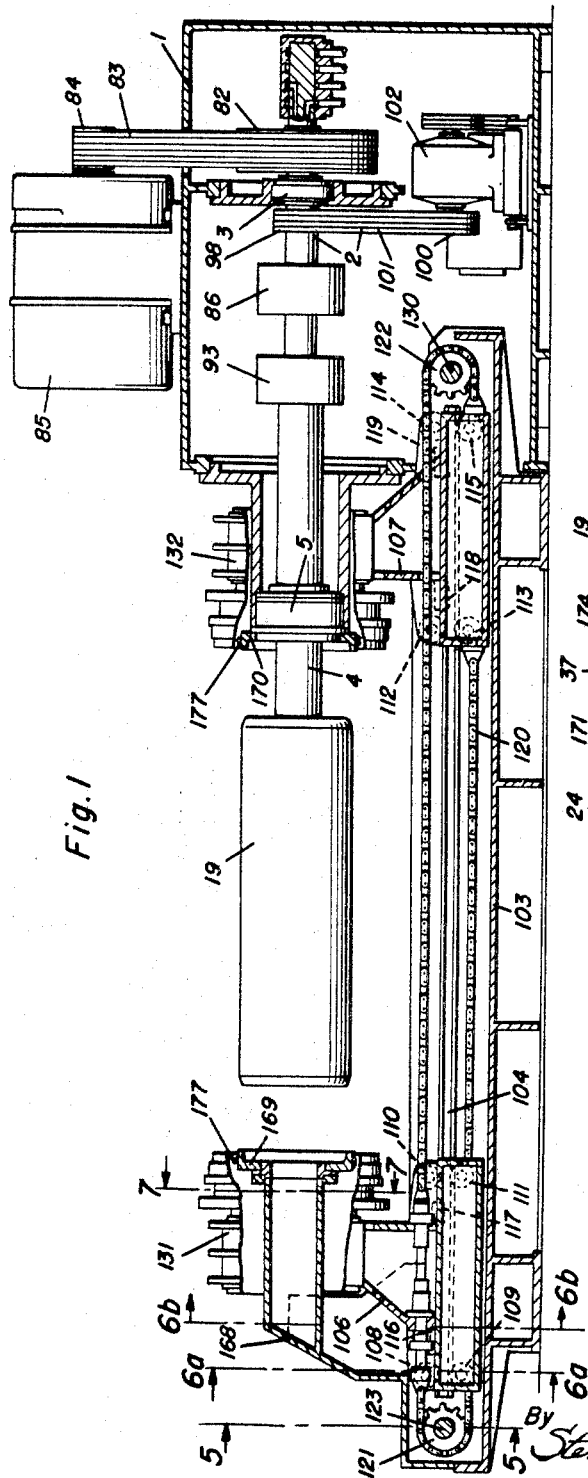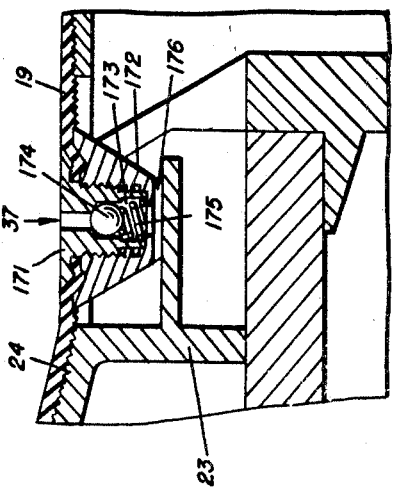
Fig.1
Fig.9
Inventors
Renato Caretta
Antonio Pacciarini
Dario Giletta
By Stevens, Davis, Miller & Mosher
Attorneys Inventors
Renato Caretta
Antonio Pacciarini
Dario Giletta
By
Stevens, Davis, Miller & Mosher
Attorneys

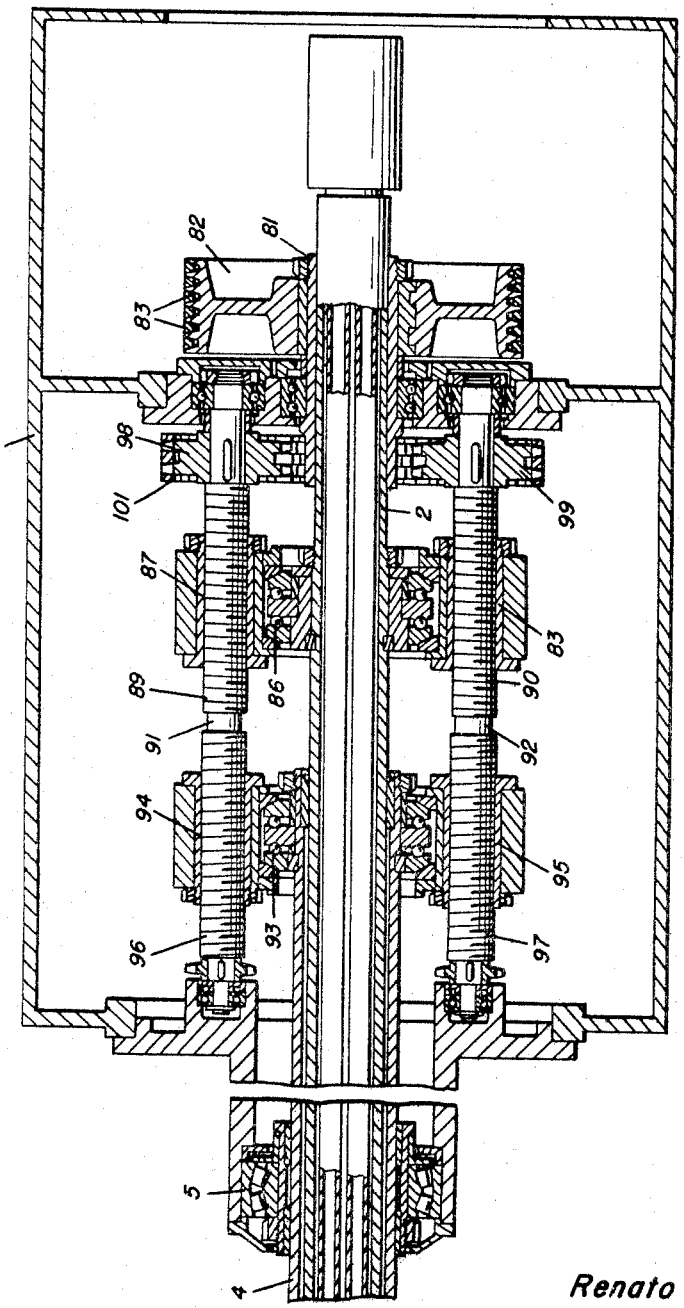

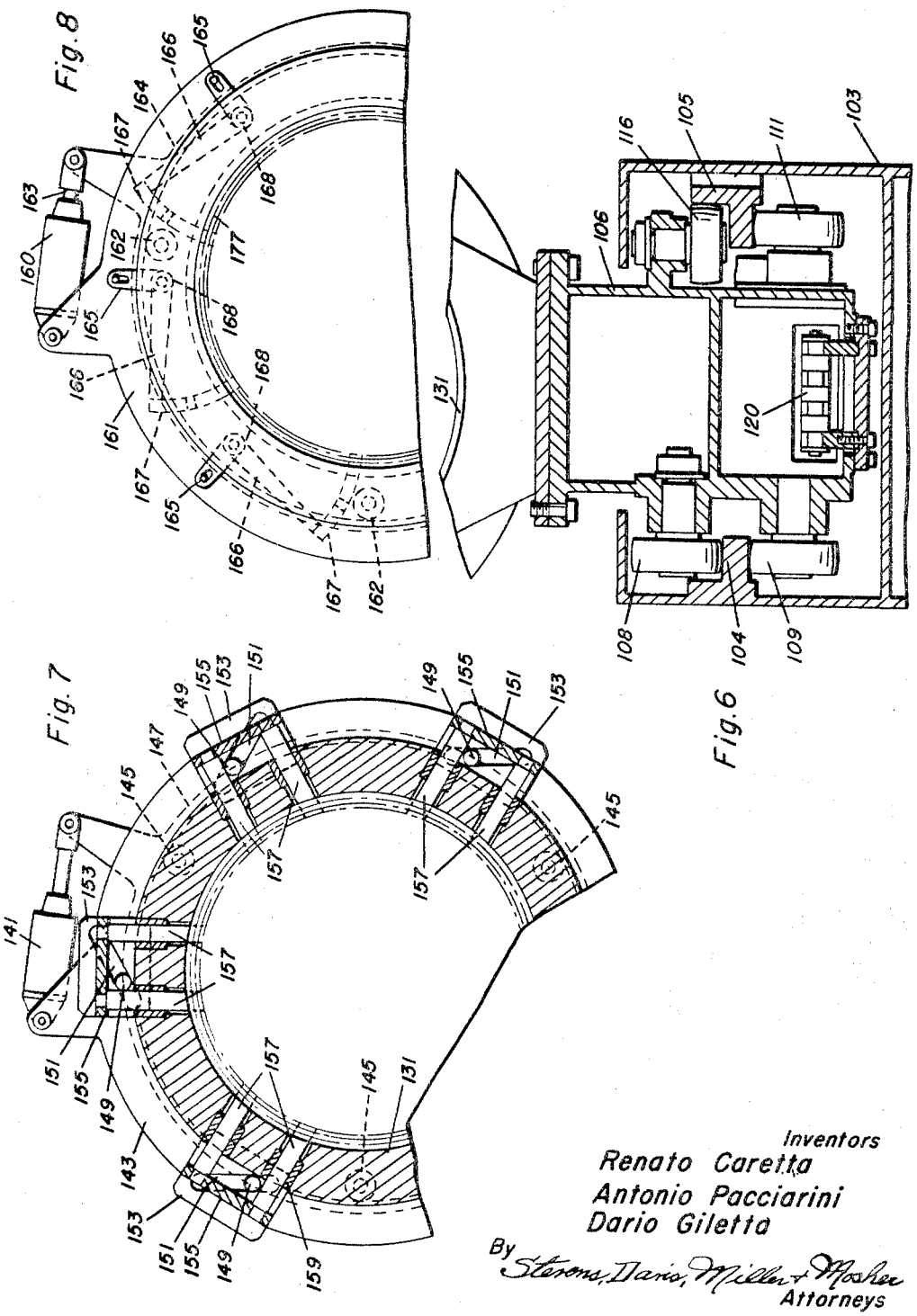

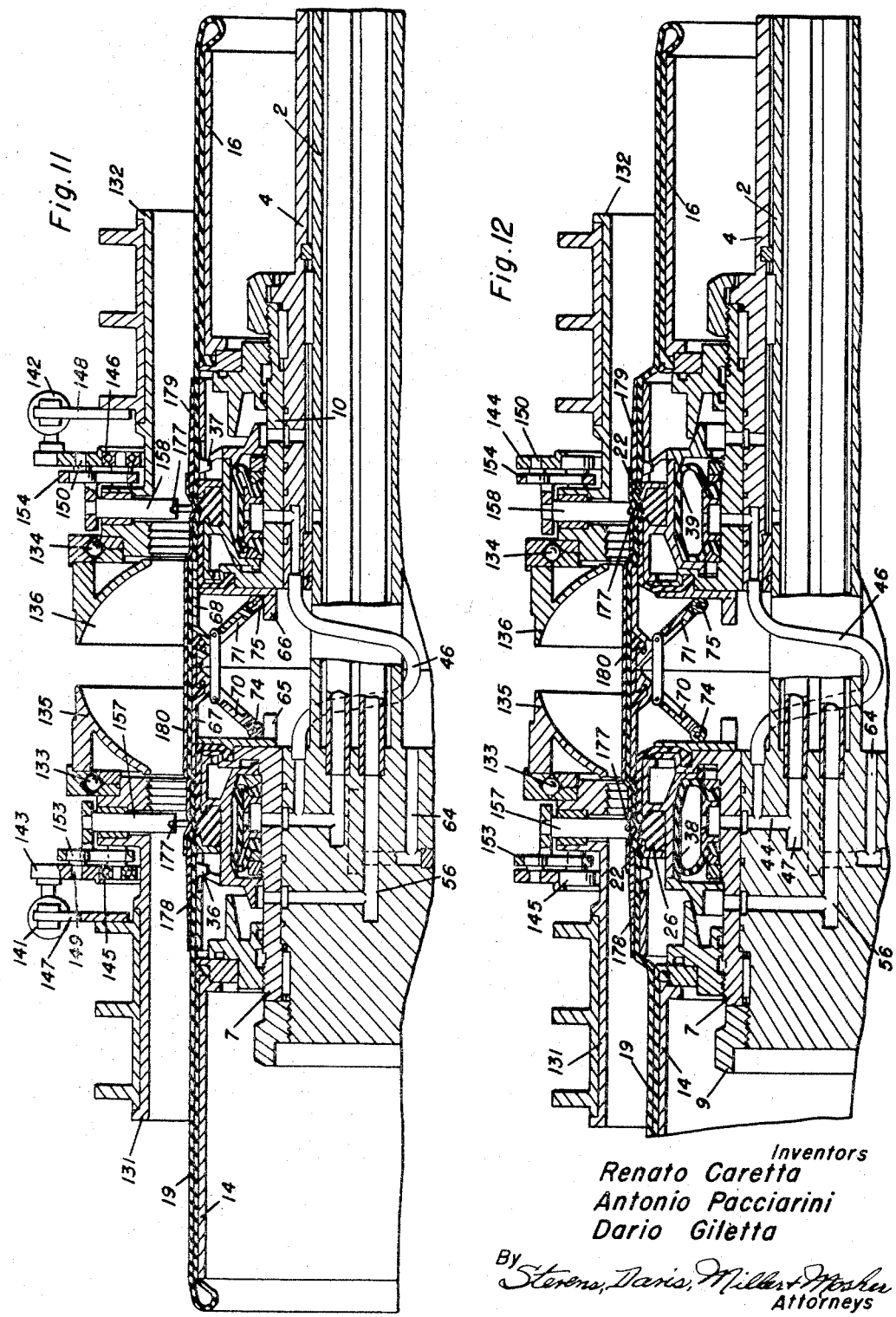

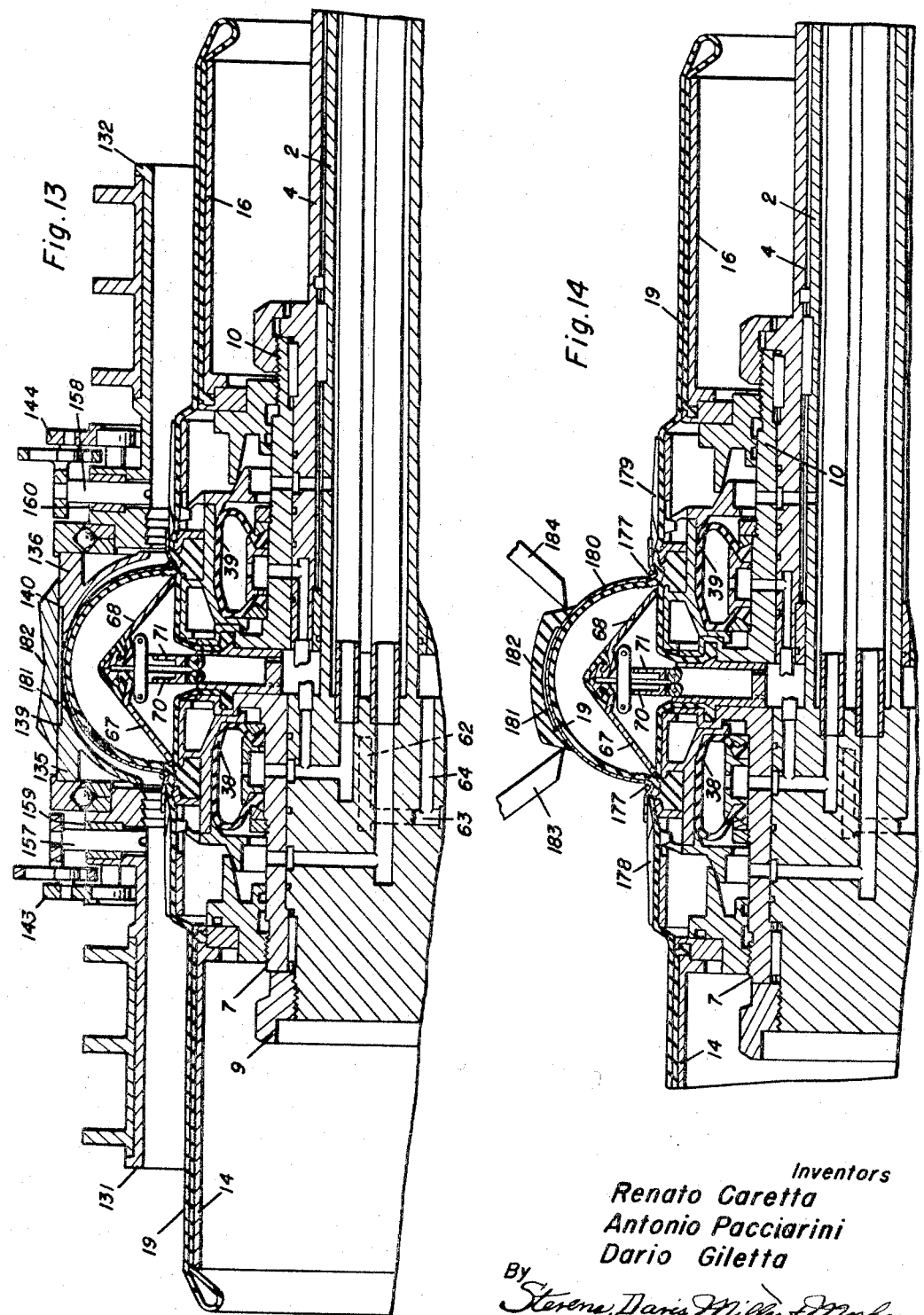

March 25, 1969
R. CARETTA ET AL
3,434,897
METHOD FOR MANUFACTURING PNEUMATIC TIRES
Filed July 23, 1965
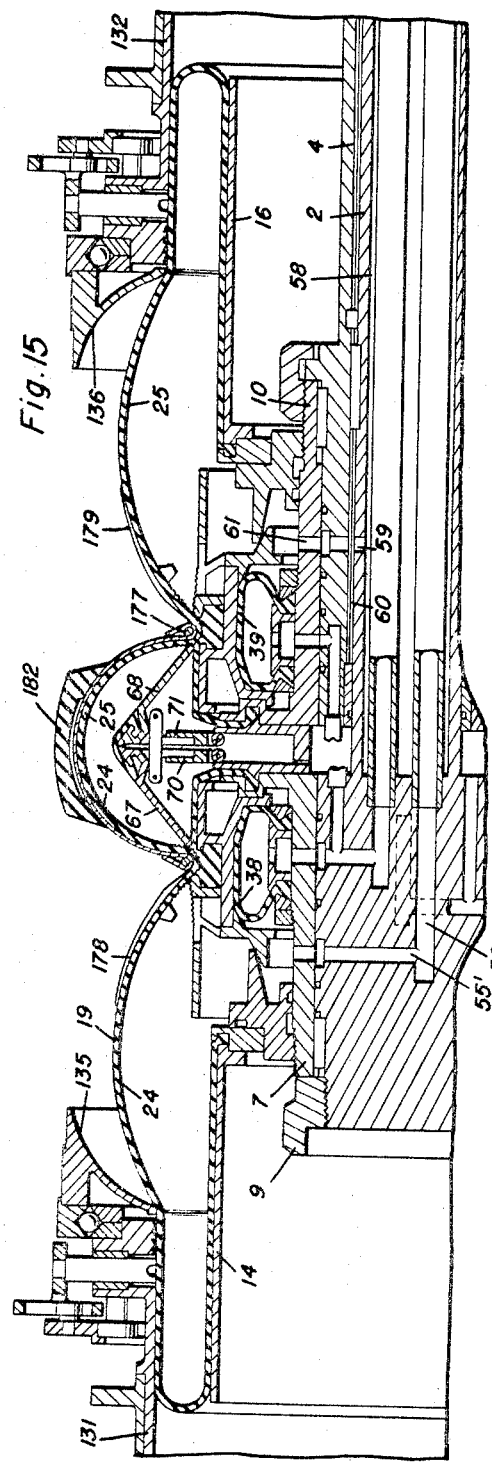
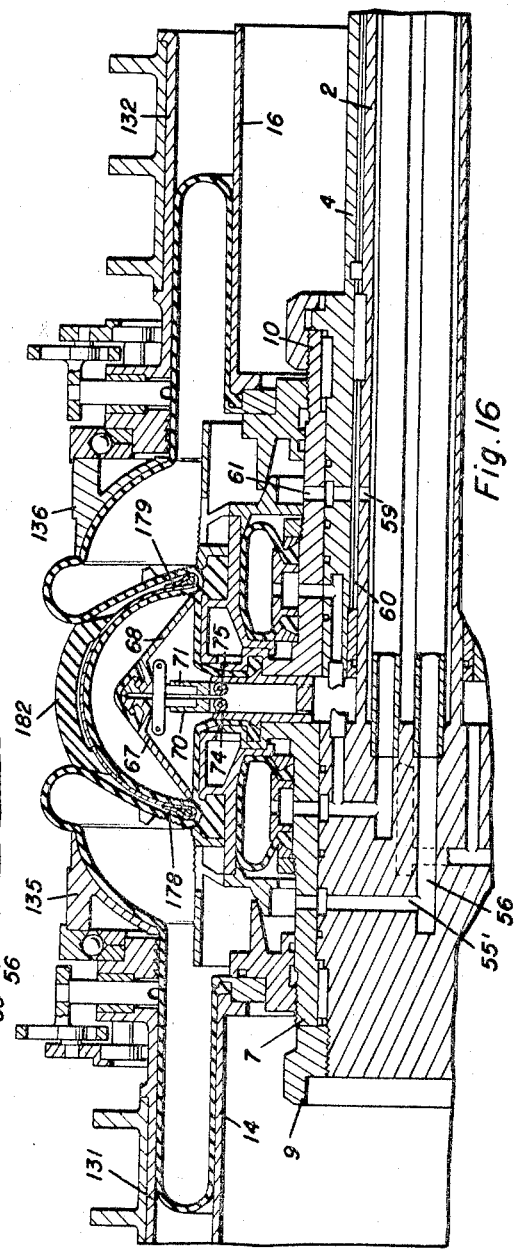
Inventors
Renato Caretta
Antonio Pacciarini
Dario Giletta
By
Stevens, Davis, Miller & Mosher
Attorneys INVENTORS
Renato Caretta
Antonio Pacciarini
Dario Giletta

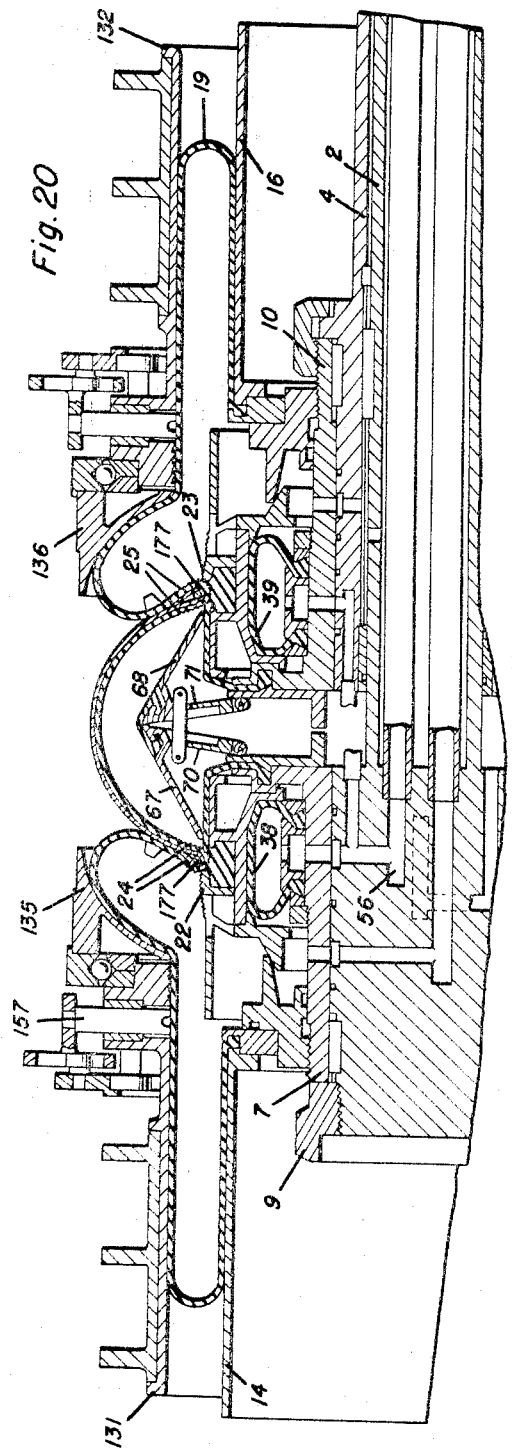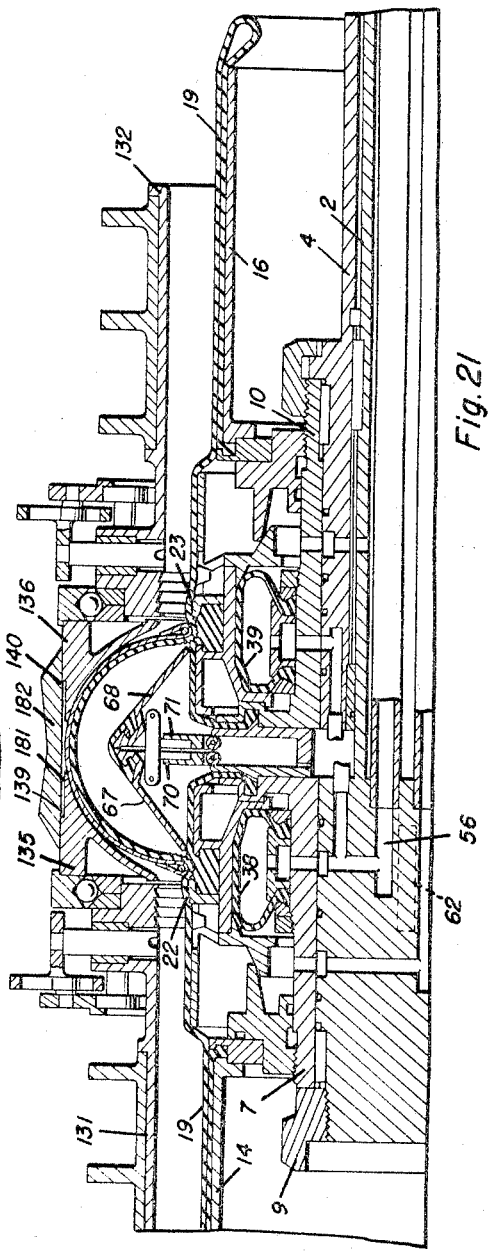

United States Patent Office 3,434,897
Patented Mar. 25, 1969

3,434,897
METHOD FOR MANUFACTURING PNEUMATIC TIRES
Renato Caretta, Gallarate, Varese, and Antonio Pacciarini and Dario Giletta, Milan, Italy, assignors to Pirelli S.p.A., Milan, Italy
Filed July 23, 1965, Ser. No. 474,400
Claims priority, application Italy, July 24, 1964, 16,209/64
Int. Cl. B60c 9/10, 13/00
U.S. Cl. 156—132      17 Claims

ABSTRACT OF THE DISCLOSURE

A method for manufacturing pneumatic tires including the step of firmly anchoring the carcass plies to the bead wire rings before expansion of the plies into toroidal carcass form, whereby the formation of said toroidal carcass form and the application of the tread band thereto may proceed to completion without having to turn up the ply ends around the bead wires until after the formation of the toroidal carcass has been completed.

---

The present invention relates to a method for manufacturing pneumatic tires having a radial or crossed carcass comprising one or more plies, in which method the edges of all the plies are turned about the bead-reinforcing wires towards the outer surface of the carcass, and the strips constituting the sidewalls and the other conventional component elements of the carcass are turned and lapped on the already shaped carcass with the same means and in the same manner as were the ply edges.

As is known to those skilled in the art, the manufacture of pneumatic tires having crossed or radial carcass, generally comprises the following operations: one or more plies are normally applied in cylindrical shape on a building drum; on these plies, in correspondence of the drum shoulders, are applied the bead-reinforcing wires in such a way that the ply ends may project laterally from these wires, and the projecting ply ends are then turned up towards the outer surface of the plies; said outer surface being maintained substantially cylindrical. If desired, the assembly so obtained is covered with one or more plies, whose edges are turned down towards the axis of the building drum and are caused to adhere to the outwardly turned edges of the first plies applied on said drum. The tire is completed, before or after the shaping operation, generally by applying a ring-shaped reinforcing structure, if desired, and the tread band and sidewall strips to the tire carcass. The strips constituting the sidewalls may be integral with the tread or independent thereof, and in the latter case their edges nearest to the carcass midline, when assembly is completed, may be lapped beneath or over the edge of the tread band. In any case, however, strip application is always carried out after having outwardly turned the edges of the carcass plies about the wires from which they project.

Besides the strips constituting the sidewalls, other strips of rubber or of rubberized fabric, having a width smaller than that of the sidewall strips, are normally applied on the carcass plies. These strips are usually applied in various stages of the tire manufacture and their application has always been carried out by hand. In fact, up to the present time, it was not possible to effect simultaneously the outward turning up of the ply edges about the bead wires and the application on the carcass of the strips constituting the sidewalls and the other component elements of the carcass itself, not even by using building drums comprising an expansible inflatable tubular membrane protruding laterally beyond the seats for the wires. This is true because inflation of the membrane to shape the carcass plies caused it to slide longitudinally (axially) towards the drum midline thereby exerting a dragging action on the overlying plies, whereby it was necessary to turn up the ply edges about the wires before inflating and shaping said plies, in order to secure them to the wires and to prevent their sliding.

The object of the present invention is to provide a method for the manufacture of pneumatic tires according to which the strips constituting the sidewalls, one or more carcass plies and the strips constituting any other conventional component elements of the carcass are disposed in cylindrical shape on an expansible tubular body, which is axially inextensible at least at its terminal portions. The bead-reinforcing wires, which can be provided with fillers, are inserted on said plies in such a way that the ply edges project laterally therefrom; a radially outwardly directed high pressure is exerted on the plies in the area underlying the bead wires, so as to divide the expansible tubular body into three fluid-tight, axially spaced, independent portions. The carcass plies are shaped by expanding the central portion of the expansible membrane and by moving the opposite portions of the membrane underlying each of the two bead wires towards each other. The tread band and, if desired, the previously applied reinforcing structure are adhered along the mid-circumferential zone of the carcass whereupon the axially lateral portions of the membrane are inflated to expand radially and they are pushed axially towards the carcass midline thereby upwardly turning the outwardly extending ply edges around the respective bead wires and against the carcass sides. Simultaneously with this upward turning of the ply ends, the sidewall strips and any other conventional carcass elements are applied against the carcass sides in the process according to this invention.

If the plies are applied in the form of a strip, they are stitched after their application on the expansible tubular body. The tread band should also be stitched after its application on the shaped carcass.

These and other features of the present invention will be more clearly apparent from the following detailed description of a preferred embodiment of the same, given only by way of example and made with reference to the attached drawings, in which:

FIG. 1 is a front view, partially sectioned, of a complete machine for carrying out the method of the present invention;

FIG. 3 is a horizontal section of the right lateral portion of the machine shown in FIG. 1;

FIG. 6 represents in its left-hand half a cross section of the machine taken along plane 6a—6a and in its right-hand half a cross section taken along plane 6b—6b in FIGURE 1;

FIG. 7 is a cross section of the device for the application of the bead wires, taken along plane 7—7 of FIG. 1;

FIG. 8 represents in cross section an alternative realization of the device for the application of the bead wires, shown in FIG. 7;

FIG. 9 is a detail of the expansible building drum of the machine shown in FIG. 1;

FIG. 10 is a detail of the central portion of the expansible building drum shown in FIG. 2;

FIGS. 11 to 16 represent the various steps of the manufacturing process according to which the strips constituting the sidewalls and the other possible component elements of the carcass are applied to the carcass simultaneously with the turning up of the ply edges about the bead wires;

FIGS. 17 to 23 represent the various steps of the manufacturing process according to which the strips constituting the sidewalls and the other possible component elements of the carcass are applied to the carcass subsequently to the turning up of the ply edges about the bead wires. FIG. 16 also illustrates the last step in this process.

Figure 2:
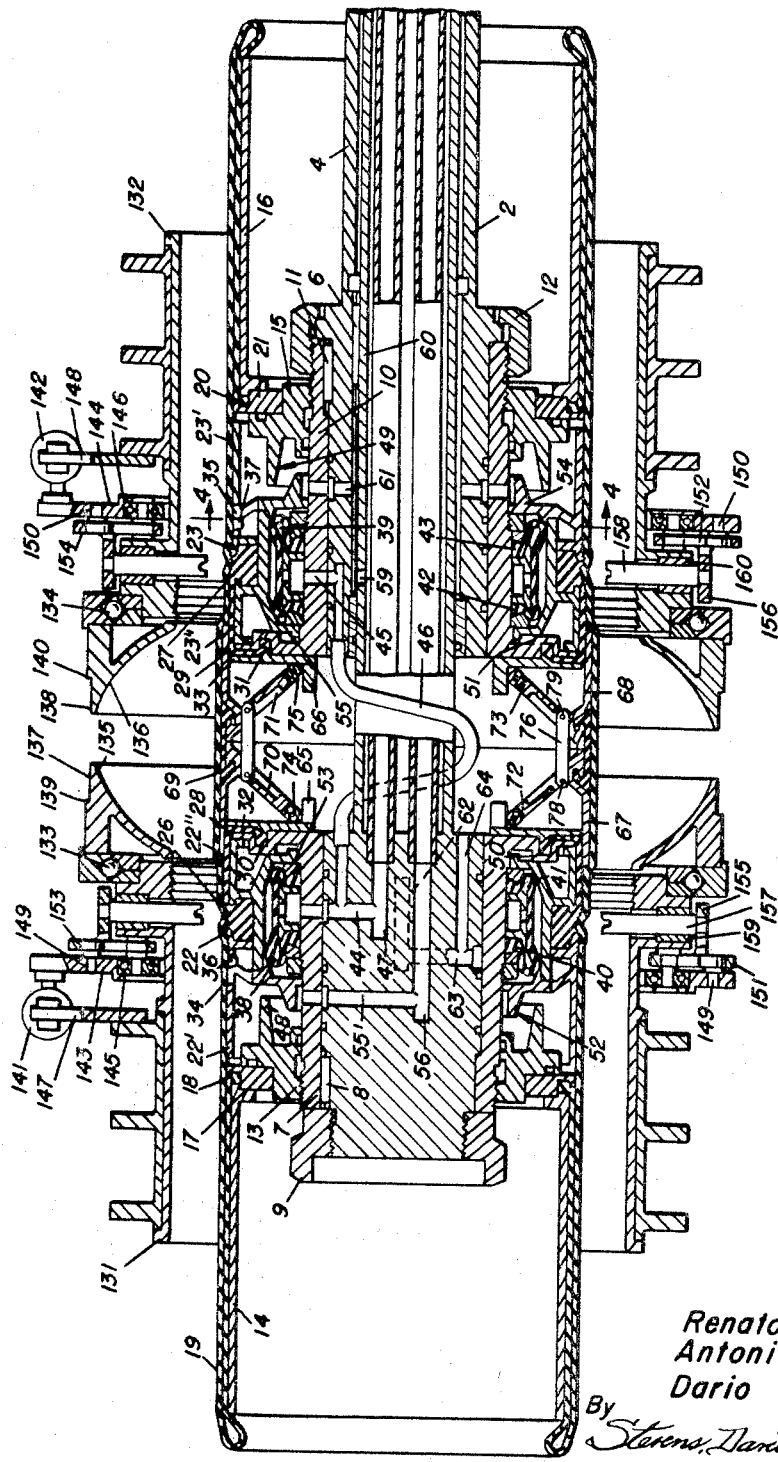
FIG. 2 is a longitudinal vertical section of the expansible building drum of the machine shown in FIG. 1, and of the devices telescopically arranged along said drum.
Figure 5:
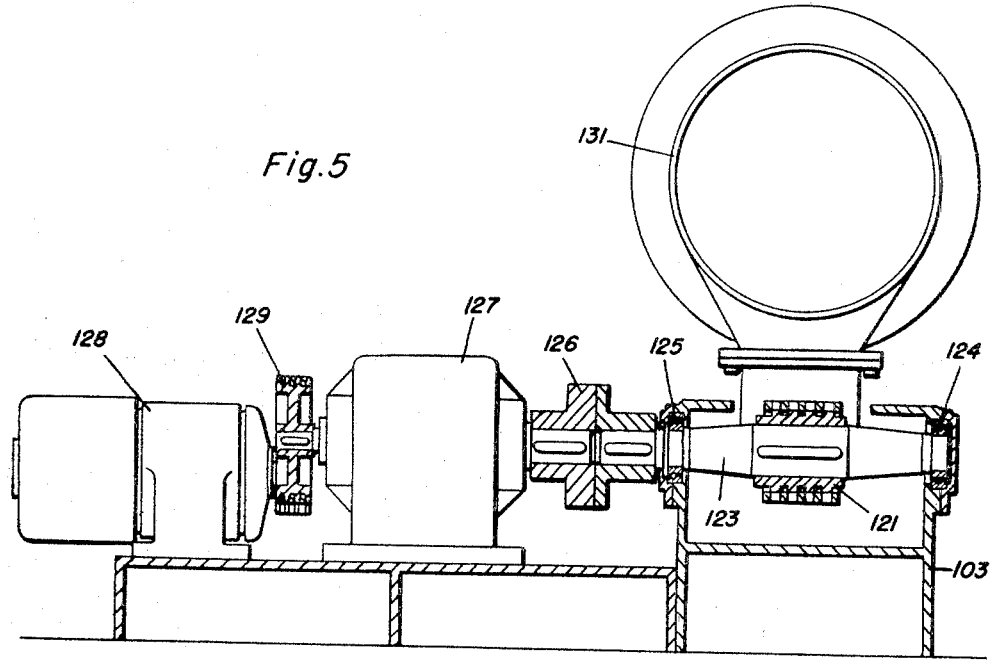
FIG. 5 is a cross section taken along plane 5—5 of FIG. 1.
Figure 4:
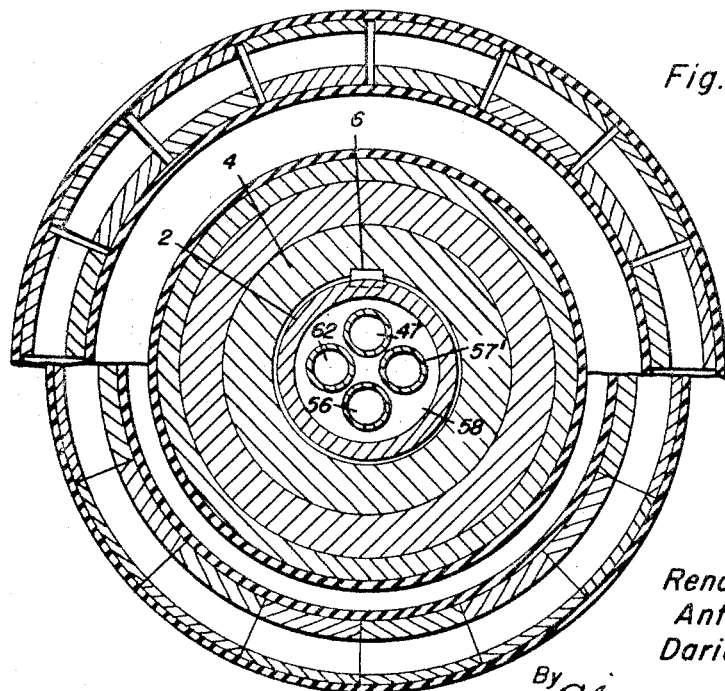
FIG. 4 is a cross section of the building drum taken along plane 4—4 of FIG. 2, the upper part of the figure representing the drum in expanded condition and the lower part representing the drum in rest condition.

The machine represented in FIGS. 1 to 10 comprises a frame 1, in which are cantilevered the hollow mandrel 2, by means of the journal bearings 3, and the hollow mandrel 4, by means of the journal bearings 5. A mutual longitudinal sliding is allowed between the mandrels 2 and 4; however they are fixed rotatively relative to each other by means of the key 6.

With particular reference to FIG. 2, the sidewall 7 of an expansible drum is mounted on the cantilever end of the mandrel 2 and is rotatively fixed relative thereto by key 8 while axial displacement is prevented by means of the nut 9 threaded on the mandrel 2.

Likewise, the sidewall 10 of the expansible drum is mounted on the end of the mandrel 4 which extends towards the sidewall 7. The rotation of this sidewall with respect to the mandrel 4 is prevented by means of the key 11, and its axial displacement is prevented by means of the nut 12 threaded on the mandrel 4.

A rigid cylinder 14 is secured to the sleeve 13 which is threaded on the sidewall 7, and a rigid cylinder 16 is secured to the sleeve 15 which is threaded on the sidewall 10. Between the rigid cylinder 14 and a ring 17 which is integral with the sleeve 13, there is clamped the thickened edge 18 of an expansible tubular membrane 19, the other thickened edge 20 of which is clamped between a ring 21 integral with the sleeve 15, and the rigid cylinder 16. The membrane 19, starting from the edge 18, rests directly on the rigid cylinder 14, forms a loop projecting from said cylinder, folds upon itself, rests subsequently on two series of circular rigid sectors 22 and 23 respectively assembled on the sidewalls 7 and 10, extends on the rigid cylinder 16, forms a second loop outside said cylinder and extends towards the drum midline, resting, as far as its thickened edge 20, directly on the cylinder 16. The membrane 19 incorporates longitudinal reinforcements which render it axially inextensible, and is provided on its inner surface with two serrated portions 24 and 25 (see FIGURE 15) overlying corresponding surfaces of axially opposed rigid sectors 22 and 23 which are arranged in two series. Membrane 19 also includes a transverse groove on its outer central surface to facilitate removal of the finished tire.

The sectors 22 and 23 are constituted by an axially outermost portion 22' and 23', provided on at least a part of its outer surface with a serrated portion corresponding to that of the portions 24 and 25 of the membrane, and by an axially innermost portion 22" and 23", having a smooth surface. Between these two portions there is defined a seat into which are respectively housed the elastic rings 26 and 27, provided with tubular extensions 28 and 29 which terminate with the thickened edges 30 and 31, respectively clamped between the sidewalls 7 and 10 and the rings 32 and 33 fastened to said sidewalls. The elastic rings 26 and 27 are peripherally provided with a concave indented recess, which constitutes the seat for the reinforcing wires of the tire beads. Tubular extensions 28 and 29 function to provide fluid tightness along those sector portions having a smooth outer surface. The sector portions, which are serrated along outer surfaces thereof adjacent to rings 26 and 27, define a frustoconical surface whose diameter decreases in the direction of the ring seats in order to provide a rigid, non-deformable support for the tire beads during the shaping of the tire carcass.

The sectors 22 and 23 in proximity of the rings 26 and 27 on their axially outermost portion 22' and 23' are moreover provided with holes 34 and 35, into which are encased the frusto-conical valves 36 and 37, tightly inserted in an opening of the membrane 19, with which they are fast. The one-way valves 36 and 37 are normally closed and open only when the pressure under membrane 19 is less than the pressure outside membrane 19, as will be described in detail herebelow.

Between the sidewall 7 and the sectors 22, and between the sidewall 10 and the sectors 23, there are respectively housed the inflatable tubular membranes 38 and 39, whose thickened edges 40, 41 and 42, 43 are clamped on the periphery of the corresponding drum sidewalls. The membranes 38 and 39 are provided with transverse shaping reinforcements along about three quarters of their transversal development, by starting from the axially outermost thickened edge (40, 43), in order not to be pinched between the series of sectors 22, 23. The portion of said membranes which is the nearest to the drum midline is devoid of reinforcements in order that the sectors may be completely displaced towards said midline when the membranes 38 and 39 are inflated to exert an axial thrust on said sectors .In this way it is possible to ensure a perfect conformity with the pre-established distance between the bead wires.

The inside of the membranes 38 and 39 may be alternatively connected with a source of compressed fluid or with an outlet, by means of ducts 44 and 45, defined in the sidewalls 7 and 10 and connected to each other by means of the tube 46, and by means of the tube 47 passing inside the mandrel 2.

The expansion of the tubular membranes 38 and 39, besides exerting a pressure on the sectors 22 and 23 towards the drum midline, brings about an outward radial displacement of said sectors, which is opposed by the elastic rings 26 and 27 and is limited by the frusto-conical surfaces 48 and 49 of the sleeves 13 and 15 and by the cylindrical surfaces 50 and 51 of the sidewalls 7 and 10, against which rest the frusto-conical surfaces 52, 53 and 54, 55 of the sectors 22 and 23.

The position of the frusto-conical surfaces 48 and 49 of the sleeves 13 and 15 may be axially varied, with respect to that of the surfaces 52 and 54 of the series of the sectors 22 and 23, by screwing more or less the sleeves 13 and 15 on the corresponding sidewalls.

By varying such mutual position, the travel of the sectors 22 and 23 may be varied radially outwardly according to the inner diameter of the bead wires adopted for the pneumatic tires to be manufactured. In the end portion of the mandrel 2 there is defined a duct 55', which opens, through the sidewall 7, in the space comprised between the sleeve 13 and the segments 22 and is connected at the other end with the tube 56 passing axially inside the mandrel 2. Moreover, this mandrel is passed through axially by the tube 57 (see FIG. 4) provided with holes 57' which open in the hollow space 58, connected by means of the hole 59 to the gap 60. This gap 60, by means of the duct 61, is also connected to the space comprised between the sleeve 15 and the segments 23. Both the tube 56 and the tube 57 may be alternatively connected with a source of compressed fluid, as for instance a tank of variable capacity, not illustrated in the figures, or with a vacuum pump. The volume and the pressure of this tank are adjusted before the process begins. The mandrel 2 also contains tube 62, one end of which is connected to the ducts 63 and 64 provided at the cantilever end of the mandrel 2, and the other end of which may be connected with a source of compressed fluid or with an outlet. The duct 64 opens in the drum space through the sidewalls 7 and 10.

The rings 32 and 33, secured to the sidewalls 7 and 10, in correspondence of their end nearest to the mandrel 2, are provided with meshing projections 65 and 66, offset with respect to each other.

Along the periphery of the projections 28 and 29 there are assembled two series of rigid sectors 67 and 68 (see FIGS. 2 and 10), coupled to each other by means of an elastic strap 69, housed into suitable recesses defined in said sectors (FIG. 10). The strap 69 enables angular movement between sectors 67 and 68 while abutting each other at one end. The sectors 67 and 68 each are provided with a leg (70 and 71), which extends towards the axis of the drum and is integral with a fork element (72, 73) in which is provided a roller (74 and 75). A shackle 76 is inserted in the holes 77 of the extensions 70 and 71 and is held in place by means of the two pins 78 and 79 so as to be allowed to slide in the holes 77 along the extensions 70 and 71.

The shackle 76 has the purpose of limiting the spreading out of the extensions 70 and 71.

At the end of the hollow mandrel 2 (FIGS. 1 and 3) opposite to that corresponding to the sidewall 7 of the expansible drum, there is assembled a bushing 81, slidable in longitudinal direction by means of the key 80 and integral with the pulley 82. The pulley 82, by means of the belt transmission 83, is connected to the pulley 84, keyed on the shaft of the reversible motor 85. Said motor, in correspondence of an intermediate portion of the mandrel 2, is connected by means of the thrust bearings 86 to the nut screws 87 and 88 which mesh respectively with the threaded portions 89 and 90 of the double-threaded shafts 91 and 92.

At the end of the hollow mandrel 4 opposite to that corresponding to the sidewall 10 of the expansible drum, said mandrel 4, by means of the thrust bearings 93, is connected to the nut screws 94 and 95, which mesh respectively with the threaded portions 96 and 97 of the shafts 91 and 92. The threads 96 and 97 are equal, but have a direction opposite to that of the threads 89 and 90.

On the shafts 91 and 92 there are respectively keyed the sprocket wheels 98 and 99 connected to each other and to the sprocket wheel 100, by means of a chain 101. The sprocket wheel 100 is keyed on the shaft of the reversible motor 102.

On the base 103 (see also FIG. 6), there are secured the rails 104 and 105, onto which the carriages 106 and 107, slidable in opposite direction, are respectively assembled by means of the pair of wheels 108, 109, 110, 111 and 112, 113, 114, 115, having horizontal axes, and 116, 117 and 118, 119 having vertical axes. The carriages 106 and 107 are connected at their ends with an annular chain 120, assembled on a sprocket wheel 121 and a transmission wheels 122. The sprocket wheel 121 (see FIG. 5) is keyed on the shaft 123, supported by the frame 103, by means of the journal bearings 124 and 125 and connected by means of a joint 126 to a motor speed reducer 127 actuated by a reversible motor 128 through the belt transmission 129; the transmission wheel 122 is assembled on the shaft 130, also supported by the frame 103. To the carriages 106 and 107 are integral the rigid cylinders 131 and 132, onto which are rotatably assembled (see FIG. 2), by means of the ball bearings 133 and 134, the bells 135 and 136, which are respectively provided on their periphery with an annular band 137 and 138 and with a step 139 and 140.

The rigid cylinders 131 and 132 are moreover provided with a serrated portion on their inner surface and each of them carries a device for the application of the bead reinforcing wires on the carcass plies.

Figure 17:
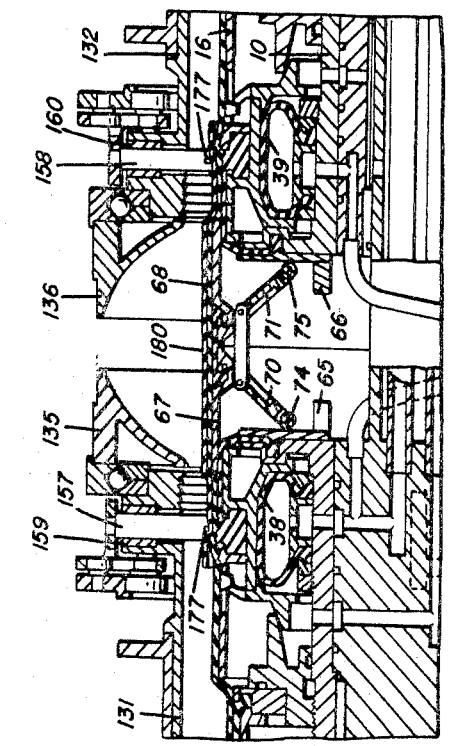
Figure 18:
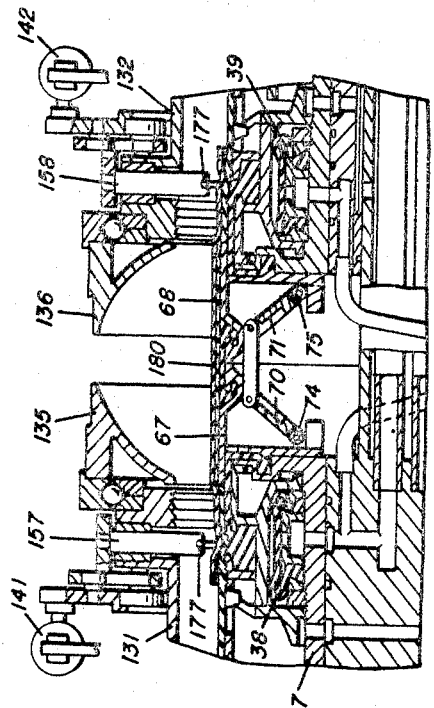
Figure 19:
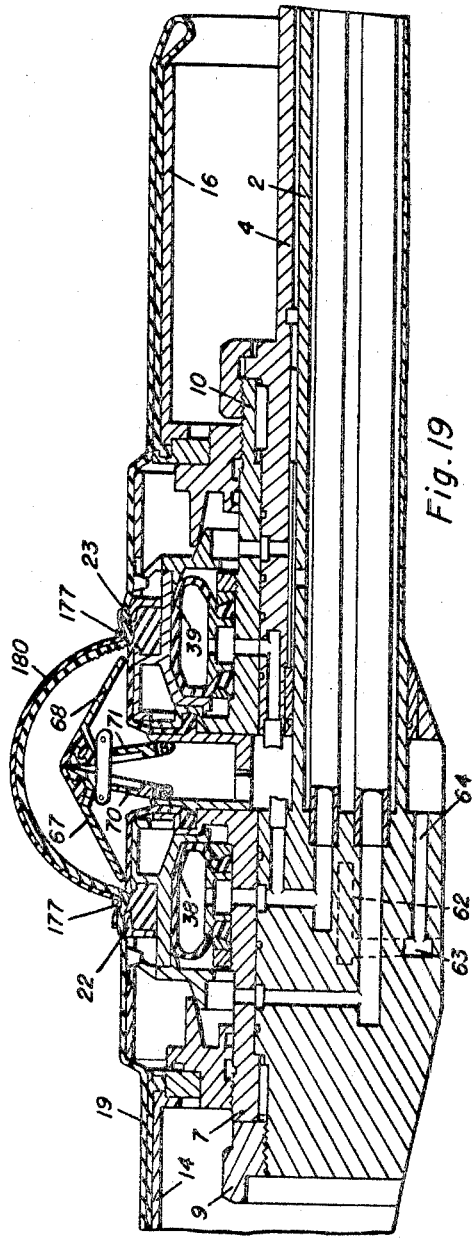

FIGS. 7 and 8 illustrate two forms of embodiment of said device; in FIGS. 11 and 17 the device of FIG. 7 is represented integrally in cross section, and in FIGS. 12–16 and 18–21 it is shown only in part.

The devices as in FIG. 7 comprise the double-acting cylinders 141, 142, supported by the rings 143, 144, rotatably assembled on the ball bearings 145, 146. The ends of the stems opposite to those connected to the pistons slidable in the cylinders 141 and 142 are respectively pivoted in an extension of the rings 147 and 148, which are integral with the rigid cylinders 131 and 132. The rings 143 and 144 carry respectively the series of pivots 149 and 150 which extend in the grooves 151 and 152 transversally obtained in the series of rectangular elements 153 and 154 disposed at equal intervals along a circumference. Each of the elements 153 and 154 is provided with an extension 155, 156, each of which is fast with a pair of fingers 157, 158, slidably assembled in the corresponding holes of the sleeves 159, 160 supported by the rigid cylinders 131 and 132.

The forward and reverse rotation of the rings 143, 144, with respect to the fixed rings 147, 148, effected by the cylinders 141, 142, displaces the pivots 149 and 150 along the grooves 151 and 152, thus causing inward and outward displacement of the pairs of fingers 157, 158 within the corresponding holes of the sleeve 159, since the pivots 149 and 150 remain always at the same distance from the center of the device while they are rotating about it. The free ends of the fingers 157 and 158 are bifurcated and magnetized.

The device represented in FIG. 8 is analogous to that of FIG. 7. It comprises a double-acting cylinder 160', one end of which is fastened in correspondence of the extension of a ring 161 rotatably assembled on the ball bearings 162. The end of the stem 163, opposite to that connected to the piston slidable in the cylinder 160', is pivoted in an extension of a fixed ring 164. On the ring 161 there are pivoted, at equal intervals along a circumference, the ends 165 of a series of bell-crank levers 166 which, at the other end, terminate with a fork. The bell-crank levers 166 are moreover hinged on the pivots 168 integral with the ring 164. The forward and reverse rotation of the ring 161, originated by the cylinder 160', causes the forward and reverse rotation of the bell-crank levers 166 about the rotating pivots 168 and consequently the advance or retreat of the ends 167 from the center of the device.

The frame 103 also carries a fixed support 168', bearing a ring 169. At the opposite side of the drum there is moreover provided a ring 170 supported by the frame 1. Both the rings 169 and 170 have an outer diameter corresponding to the inner diameter of the bead wires to be applied to the tire carcass.

Small magnets, not shown, are disposed at equal intervals along the periphery of the rings 169 and 170 and function to temporarily hold in place the bead wires applied on the periphery of said rings.

FIG. 9 represents a detail of the small valve 37. This valve comprises two threaded elements 171 and 172 and is provided with an axial opening 173, of variable diameter, in which is enclosed a ball 174 supported by a helical spring 175.

In cooperation with its supporting base provided on the rigid sector 23, the small valve 37 is provided with an opening 176 to allow the air suction from the outside to the inside through the through hole 173.

The various steps of manufacture represented in FIGS. 11 to 16 will now be described with reference to the above indicated apparatus.

According to the process shown in said figures, a reinforcing bead wire 177 is applied both on the ring 169 and on the ring 170, in contact with the series of small magnets provided on said rings, so that said magnets hold the bead wires in place on the rings. Then cylindrical sidewall strips 178 and 179 are applied about the lateral sections of the expansible drum, with the sidewalls 7 and 10 at the greatest pre-set mutual distance from each other. For this operation, the tubes 56 and 57 are connected with a vacuum pump in order to displace towards the inside the balls 174 of the valves 36 and 37 and to suction air from the outside to the inside through openings 173 so as to releasably fasten to the openings of said holes the ends of the sidewall strips 178 and 179. The drum is rotated by means of the motor 85, the pulleys 84 and 82 and the belt 83 in order to facilitate the winding of the sidewall strips for a whole turn about the membrane 19. Then one or more carcass plies 180 and possibly other strips constituting other conventional component elements of the carcass, not represented in the figures for the sake of simplicity, are applied on the revolving drum and are stitched by means of conventional rolling devices on the rigid sectors 22, 23 and 67, 68, while legs 70 and 71 are in the position of maximum spreading and the rollers 74 and 75 rest on the projections 65 and 66.

After stopping the motor 85, the carriages 106 and 107 are advanced toward each other to bring the devices 157, 158 in proximity of the annular supports 169 and 170 for the application of the bead wires.

The mutual approach of the carriages 106 and 107 is operated by means of the motor 128, the sprocket wheels 121 and 122 and the chain 120. Then compressed fluid is admitted into the cylinders 141 and 142 so as to actuate the piston extensions to which are pivoted the extensions of the rings 147 and 148 (see FIG. 7). Consequently the rings 143 and 144 rotate on the ball bearings 145 and 146, dragging into rotation the pivots 149 and 150 which, travelling along the corresponding grooves 151 and 152, radially push towards the center of the device the elements 153 and 154 and the corresponding pairs of fingers 157 and 158. The ends of fingers 157 and 158 are bifurcated and, if desired, magnetized, and partially surround the bead wires 177 in correspondence of the intervals existing between the small magnets. These fingers detach said bead wires from the magnets to carry them off, while the carriages 106 and 107 are mutually advancing until the corresponding device for the application of the bead wires reaches the position at which the bead wires are to be applied.

At this moment compressed fluid is admitted through the tube 47 and the ducts 44, 46 and 45, connected to it, and the membranes 38 and 39 are inflated; these membranes push radially towards the outside the series of rigid sectors 22 and 23 which in turn force surfaces 52, 53 and 54, 55, respectively, against the fixed surfaces 48, 50 and 49, 51, and consequently, the elastic rings 26 and 27 and the pairs of rigid sectors 67, 68, thus pressing the carcass plies 180 against the surface of the bead wires 177, to which they adhere (see FIG. 12). Then the fingers 157 and 158 are withdrawn in the corresponding holes of the sleeves 159 and 160, discharging the compressed fluid previously admitted into the cylinders 141 and 142, and admitting compressed fluid at the other end so as to cause the rotation of the rings 143 and 144 in the opposite sense. In this way the bead wires 177 remain secured to the carcass plies.

The carriages 106 and 107 are now mutually advanced by means of the motor 128, until the bells 135 and 136 take a position outside the zone between the two bead wires 177, so that the latter may be progressively advanced towards each other during the shaping of the carcass and, at the end of said operation, may take such a position that a free space is left between the two bells 135 and 136 (see FIG. 13).

The complete shaping of the carcass is carried out by admitting compressed fluid inside the central portion of the membrane 19, through the tube 62 and the ducts 63 and 64, and at the same time by mutually approaching the sidewalls 7 and 10 by means of the motor 102 which, through the sprocket wheel 100 and the chain 101, actuates the sprocket wheels 98 and 99 and imparts rotation to the shafts 91 and 92 to mutually detach the nut screws 94, 87 and 95, 88.

In order to allow the approach of the sidewalls 7 and 10, the pairs of rigid sectors 67 and 68 are lifted outward along the drum midline so as to form an angle, while the legs 70 and 71 are placed in parallel position and in mutual contact, and the rollers 74 and 75 slide radially along the rings 32 and 33. The drum is placed again in rotation by means of the motor 85, and the ring-shaped reinforcing structure 181, and successively the tread band 182 in the form of a strip, are wound up between the steps 139 and 140 of the outer surface of the bells 135 and 136, which are also dragged into rotation by friction by the underlying carcass, and are caused to adhere to the annular band of the carcass visible between the two bells 135 and 136 (see FIG. 13). Both the ends of the reinforcing structure 181 and those of the tread band 182 are joined to one another.

At this moment the carriages 106 and 107 are detached by means of the motor 128 and, by placing again the drum into rotation by means of the motor 85, the reinforcing structure 181 and the tread band 182 are completely stitched on the outer surface of the carcass by means of conventional stitching discs 183 and 184 (see FIG. 14). The rotation of the drum is now stopped and the carriages 106 and 107 are mutually advanced by means of the motor 128 in order that the rigid cylinders 131 and 132, supported by them, may partially surround the lateral pockets of the membrane 19; then compressed fluid, the volume and the pressure of which have been previously adjusted in the two tanks of variable capacity, is instantaneously admitted through the tube 56 and the relative duct 55 and through the tube 57, the hollow space 58, the hole 59, the gap 60 and the hole 61, to inflate the two lateral pockets of the membarne 19 and to force them against the inner indented surface of the rigid cylinders 131 and 132 (see FIG. 15). The carriages 106 and 107 are further approached to press with the bells 135 and 136 the lateral parts of the membrane 19 in an axial direction, thus turning up at the same time the ply edges about the bead wires and the strips constituting the sidewalls and the other component elements of the carcass on the shaped carcass in order to cause both the ply edges and said strips (see FIG. 16) to firmly adhere to the latter. Following this, carriages 106 and 107 are withdrawn and the tire subsequently is removed.

On the apparatus described above may be of course carried out also the alternative method of manufacture represented in FIGS. 17 to 23, according to which the application of the strips constituting the sidewalls and the other possible component elements of the carcass is carried out independently of the turning up of the ply edges about the bead wires.

According to the method illustrated in FIGS. 17 to 23, before starting the tire manufacture, the bead wires 177 are applied on the rings 169 and 170. Then one or more carcass plies 180 are applied on the drum and are stitched, the drum, placed into rotation by the motor 85, having a cylindrical shape and its sidewalls 7 and 10 being at their greatest mutual distance. After the drum is stopped, the carriages 106 and 107 are mutually advanced by means of the motor 128 to bring the bead wires 177 into correct position by means of the series of fingers 157 and 158, which were previously moved towards the axis of the drum by actuating the pistons slidable in the cylinders 141 and 142 (see FIG. 17). Then, as described above, the tubular membranes 38 and 39 are inflated to cause the bead wires 177 to adhere to the carcass plies 180 (see FIG. 18), and the fingers 157 and 158 are withdrawn inside the holes of the sleeves 159 and 160.

The carriages 106 and 107 are detached by actuating the motor 128 in the opposite direction, and the plies comprised between the two bead wires are partially shaped by mutually advancing the sidewalls 7 and 10 by means of the motor 102. At the same time, compressed fluid is admitted inside the central portion of the membrane 19 through the tube 62 and the ducts 63 and 64 (see FIG. 19).

In order to turn up the ply edges about the bead wires 177, the carriages 106 and 107 are mutually advanced by means of the motor 128 so that the rigid cylinders 131 and 132, supported by them, may partially surround the two lateral portions of the membrane 19 and then compressed fluid, the volume and the pressure of which have been previously adjusted to the tanks of variable capacity, is instantaneously admitted through conduits 56 and 57 in order to inflate the two lateral pockets of the membrane 19 and to engage them against the inner indented surface of the rigid cylinders 131 and 132.

The carriages 106 and 107 are further advanced so that bells 135 and 136 press the lateral parts of the membrane 19 against the surface of the partially shaped carcass and so that the ply edges are turned up about the bead wires 177 to firmly adhere to thereto (see FIG. 20).

At this moment the lateral pockets of the membrane 19 are deflated and the carcass is completely shaped by admitting additional compressed fluid through the tube 62 and by further mutually advancing the drum sidewalls 7 and 10 by means of the motor 102. The bells 135 and 136 are also mutually advanced, by means of the motor 128, in such a way that an annular central strip of the carcass may be left free between them. The motor 85 is actuated again to place the expansible drum into rotation. The ring-shaped reinforcing structure 181, and successively, the tread band 182 in the form of a strip are wound up between the steps 139 and 140 of the outer surface of the bells 135 and 136, which are dragged into rotation by friction by the underlying carcass, and are caused to adhere to the annular band of the carcass visible between the two bells 135 and 136 (see FIG. 21). Both the ends of the reinforcing structure 181 and those of the tread band 182 are joined to one another.

At this moment the carriages 106 and 107 are withdrawn by motor 128. By motor 85 again placing the drum into rotation, the reinforcing structure 181 and the tread band 182 are completely stitched on the outer surface of the carcass by means of the stitching discs 183 and 184 (see FIG. 22). At the same time the tubes 56 and 57 are connected with a vacuum pump so as to create a suction (reduced pressure) on the inside through holes 173, and therefore, the ends of the sidewall strips 178 and 179 are secured to the openings of said holes; said strips are then wound up for a whole turn about the membrane 19 to form a continuous ring. The strips constituting the other component elements of the carcass may have been previously stitched to the strips constituting the sidewalls.

Then the rotation of the drum is stopped and the connection of the tubes 56 and 57 with the vacuum pump is interrupted. The carriages 106 and 107 are then partially advanced so that the rigid cylinders 131 and 132 surround the outermost part of the lateral pockets of the membrane 19 and said pockets are inflated again by instantaneously admitting compressed fluid, from the pressure tanks, through the tubes 56 and 57, in order to engage them in the indentations of the rigid cylinders 131 and 132 (see FIG. 23).

The carriages 106 and 107 are further mutually advanced in order that the bells 135 and 136 may push the lateral pockets of the membrane 19 against the outer surface of the completely shaped carcass, so that the strips constituting the sidewalls and the other component elements of the carcass are turned up and firmly stitched to the carcass itself (see FIG. 16).

We claim:

1. A method of manufacturing pneumatic tires by providing a radially expansible tubular body having a central portion and two lateral portions, whereby said central portion and said lateral portions are coaxial, the terminal end of each said lateral portion being fixed, covering said central portion and the centralmost parts of said lateral portions with one or more cylindrical carcass plies, applying circular bead wires on said carcass plies at positions spaced from the ends thereof and at the boundaries between each lateral portion and said central portion so that the edges of said plies extend laterally beyond said bead wire locations, exerting a radially outward pressure on the plies in correspondence to the circumferential extent of the bead wires, whereby said bead wires axially divide said expansible tubular body into three fluidtight portions, expanding said central portion and at the same time mutually advancing the portions of the tubular body underlying the bead wires toward each other, stopping said advance when the wires are at a predetermined distance from each other, subsequently turning said projecting ply edges outward and toward said central portion around said bead wires by inflating each said lateral portion such that said ply edges adhere to the plies covering said shaped central portion.

2. The method as set forth in claim 1, further comprising deflating said lateral portions after said ply edges adhere to said central portion so that said lateral portions are once again cylindrical, again, mutually advancing said bead wires toward each other, stopping said bead wire advance when said wires reach another predetermined distance from each other, applying a tread band to said central portion after said step of stopping, covering each said lateral portion with a cylindrical sidewall strip, turning each said sidewall strip upward and toward said central portion around said bead wires by again inflating each said lateral portion such that said sidewall strips adhere to the shaped plies.

3. The method as set forth in claim 1, wherein said tread band is stitched subsequent to application thereof on the plies covering said central portion.

4. A method of manufacturing pneumatic tires by providing a radially expansible tubular body having a central portion and two lateral portions, whereby said central portion and said lateral portions are coaxial, the terminal end of each said lateral portion being fixed, covering each said lateral portion with a cylindrical sidewall strip, covering said central portion and the centralmost part of said lateral portions with one or more cylindrical carcass plies such that the edges of said plies lie at least partially on top on at least part of said sidewall strips, applying circular bead wires on said carcass plies at positions spaced from the ends thereof and at the boundaries between each lateral portion and said central portion so that the edges of said plies extend laterally beyond said bead wire location, exerting a radially outward pressure on the plies in correspondence to the circumferential extent of the bead wires, whereby said bead wires axially divide said expansible tubular body into three fluidtight portions, expanding said central portion and at the same time mutually advancing the portions of the tubular body underlying the bead wires toward each other, applying a tread band to said central portion after said central portion has reached a predetermined shape, subsequently simultaneously turning said projecting ply edges and said sidewall strips outward and toward said central portion around said bead wires by inflating each said lateral portion such that said ply edges and said sidewall strips adhere to said shaped central portion.

5. A method for manufacturing pneumatic tires wherein carcass forming plies are laid flat circumferentially along a cylindrical drum with opposite axial ends of said plies extending axially beyond the locations to be occupied by subsequently applied overlying spaced apart bead wire rings, and wherein the extent of said plies between said rings is radially expanded by means of a central portion of an inflatable membrane into a toroidal carcass form and said ply ends are turned around the respective bead wire rings and pressed against a respective sidewall of said toroidal carcass form by end portions of said membrane on either side of said central membrane portion, the method comprising the steps of:
   (a) firmly anchoring said plies prior to inflation of said central membrane portion to the respective bead wires so as to prevent axial displacement of said plies relative to said wires;
   (b) inflating said central membrane portion and mutually approaching the portions overlaid by the bead wire rings so as to expand the axial extent of said plies between said wire rings into a toroidal carcass form while said end portions of said membrane are deflated and said ply ends are flat along said drum;
   (c) applying and securing a tread band around said carcass with said end membrane portions remaining deflated; and, (d) inflating said end membrane portions to turn said ply ends around said bead wires and to press said ply ends against the carcass sidewalls.

6. The method of claim 5, wherein the tread band is completely stitched to said tubular carcass form during step (c).

7. The method of claim 5, including in step (c) the application of a reinforcing structure circumferentially around said toroidal carcass form beneath said tread band.

8. The method of claim 5, wherein the central portion of the membrane is fully inflated in step (b) and said tread band is applied and secured to said carcass form prior to the inflation of said end portions of said membrane in step (d).

9. The method of claim 5, including the step of laying sidewall strips onto the end membrane portions before laying the carcass forming plies whereby upon inflation of said end portions of said membrane said sidewall strips are pressed against said toroidal carcass form simultaneously with and overlying said ply ends.

10. The method of claim 9, including the step of laying other conventional sidewall elements in addition to said sidewall strips beneath said ply ends prior to inflation of said central portion of said membrane whereby upon inflation of said end portions of said membrane said strips and other elements are all pressed against said toroidal carcass form simultaneously with and overlying said ply ends.

11. The method of claim 5, including the additional steps of:
(e) deflating said membrane end portions and laying tire sidewall elements circumferentially along the deflated membrane end portions; and,
(f) re-inflating said membrane end portions to press said sidewall elements against the sidewall portions of said toroidal carcass portion.

12. The method of claim 11, wherein said central portion of said membrane is only partially inflated in step (b) and the toroidal carcass form being only partially completed in said step (b), whereupon said end portions of said membrane are inflated to turn up the ply ends around the bead wire rings and to press said ply ends against the sidewalls of the partially completed tubular form, the end portions of said membrane then being deflated and the central portion of said membrane being fully inflated and the toroidal carcass form being fully completed, whereupon said tread band is applied and secured circumferentially around said carcass form.

13. The method of claim 12, wherein after the application of said tread band, tire sidewall elements are laid circumferentially around the deflated end portions of said membrane, said end portions then being re-inflated to apply said sidewall elements against the sidewalls of the toroidal carcass form.

14. The method of claim 12, wherein said bead wire rings are mutually approached to a certain axial distance apart from each other during the time of the partial inflation of said central portion of said membrane and are maintained thereat up until after the ply ends are turned up around said wire rings, said rings then being advanced to a position closer to each other and maintained at this closer position while said central portion of said membrane is fully inflated and while said tread band is applied to said carcass.

15. The method of claim 5, wherein step (a) is carried out by radially outwardly compressing that portion of the plies underlying said bead wire rings against the respective bead wire rings.

16. The method of claim 15, including the step of providing a radially expandable seating surface beneath respective axial extents of said membrane which underlie each of the respective bead wire rings, and the step of radially expanding said seating surface to compress said membrane extents and said plies radially outwardly against said bead wire rings.

17. The method of claim 16, including the provision of cooperating serrated surfaces on said membrane extents and on said seating surfaces to inhibit axial sliding of said membrane relative to said bead wires.

References Cited

UNITED STATES PATENTS

| | | | |
|---|---|---|---|
| 3,053,308 | 9/1962 | Vanzo et al. | 156—416 |
| 3,185,607 | 5/1965 | Nebout | 156—401 X |
| 3,265,549 | 8/1966 | Woodhall et al. | 156—416 |

HAROLD ANSHER, *Primary Examiner.*

U.S. Cl. X.R.

156—133, 401, 403, 412, 416

UNITED STATES PATENT OFFICE
CERTIFICATE OF CORRECTION

Patent No. 3,434,897                                                March 25, 196

Renato Caretta et al.

It is certified that error appears in the above identified
patent and that said Letters Patent are hereby corrected as
shown below:

Column 2, line 13, "pro-" should read -- por- --. Column 5, line 10, "provided" should read -- pivoted --; line 48, "wheels 122" should read -- wheel 122 --. Column 8, line 73, "to" should read -- in --. Column 10, line 15, "turn-" should read -- turning --.

Signed and sealed this 14th day of April 1970.

(SEAL)
Attest:

Edward M. Fletcher, Jr.                           WILLIAM E. SCHUYLER, JR.
Attesting Officer                                    Commissioner of Patents